United States Patent

[11] 3,608,535

| [72] | Inventors | John H. Winston<br>Menomonee Falls;<br>Burzoe K. Ghandhi, Milwaukee, both of Wis. |
|---|---|---|
| [21] | Appl. No. | 773,764 |
| [22] | Filed | Nov. 6, 1968 |
| [45] | Patented | Sept. 28, 1971 |
| [73] | Assignee | Outboard Marine Corporation<br>Waukegan, Ill. |

[54] SEALANT FOR WEAR-RESISTANT COATING
2 Claims, 6 Drawing Figs.

[52] U.S. Cl. .................................................. 123/193 C,
92/169, 117/119, 117/169 A, 418/178, 418/179
[51] Int. Cl. ........................................................ F02f 1/00,
F02b 55/14
[50] Field of Search ............................................. 123/191 A,
193 C, 193 P; 103/126 M, 216 M; 418/178, 179;
92/169, 170; 308/237, 238; 117/119, 127, 169,
169 A

[56] References Cited
UNITED STATES PATENTS

| 3,054,649 | 9/1962 | Arnold et al. | 92/170 X |
| 3,214,287 | 10/1965 | Mosna | 117/169 X |
| 3,289,649 | 12/1966 | Lamm | 103/216 M X |
| 3,318,515 | 5/1967 | Jones | 92/169 X |
| 3,364,065 | 1/1968 | Cutright | 117/169 X |
| 3,394,877 | 7/1968 | Hantzsche et al. | 103/216 M X |

Primary Examiner—Allan D. Herrmann
Attorneys—Robert K. Gerling, Robert E. Clemency, John W. Michael, Gerrit D. Foster, Bayard A. Michael, Joseph A. Gemignani, Andrew O. Riteris and Spencer B. Michael

ABSTRACT: Disclosed herein is the impregnation of a sealant in the pores of the wear-resistant coating on the cylinders or combustion chamber of an internal combustion engine to prevent corrosion of the underlying cylinder walls and blistering of the wear-resistant coating and to thereby increase the life of the wear-resistant coating and the piston seals.

PATENTED SEP 28 1971 3,608,535
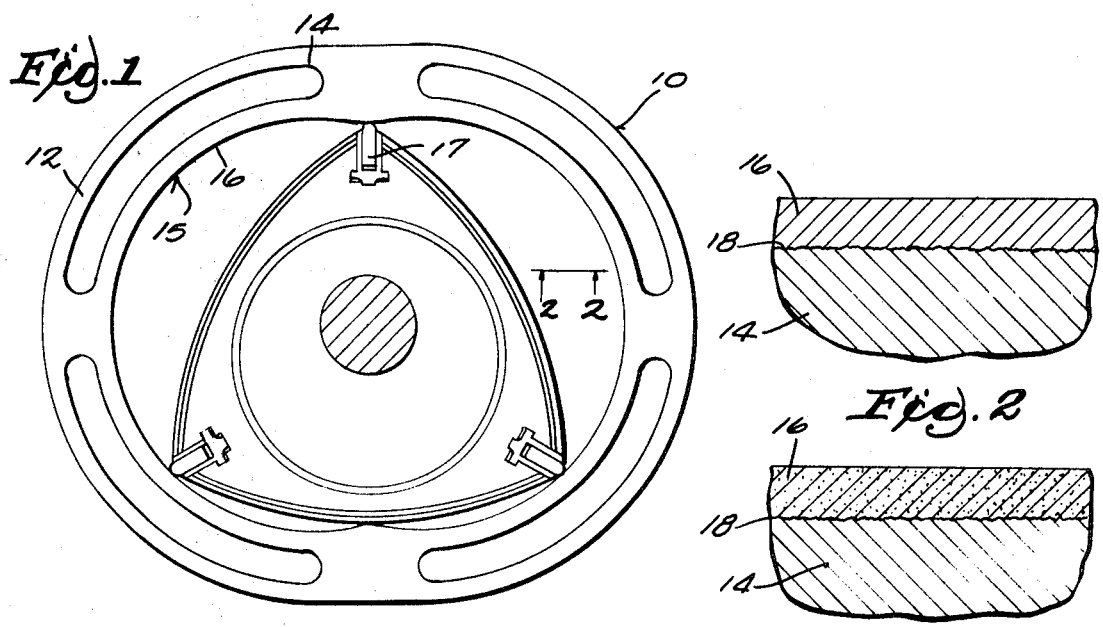
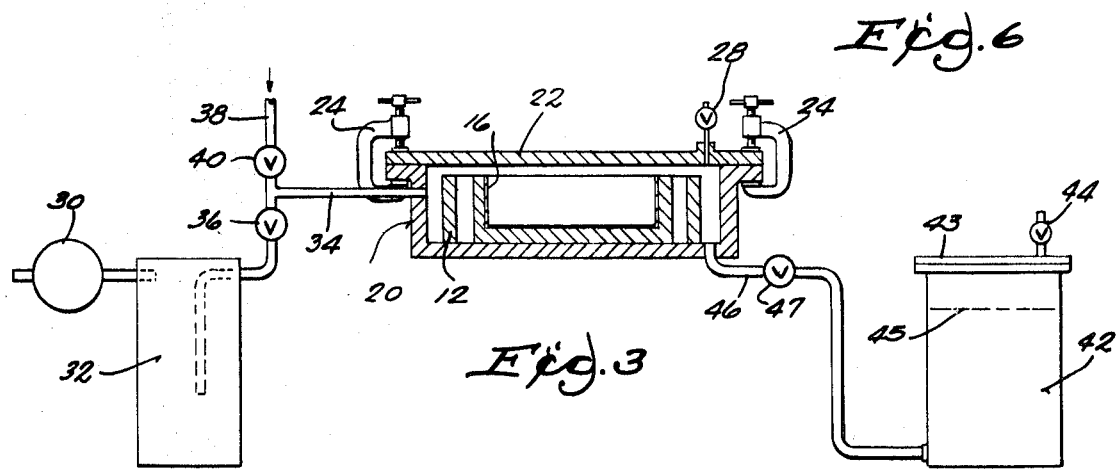
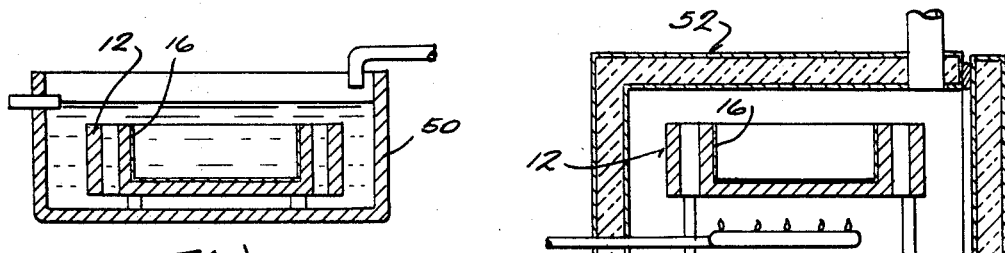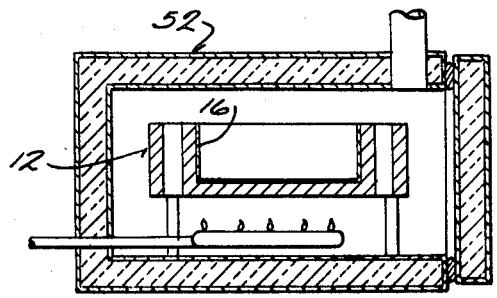
INVENTORS
JOHN H WINSTON
BURZOE K. GHANDHI
BY Wheeler, Wheeler, House & Clemency
ATTORNEYS

SEALANT FOR WEAR-RESISTANT COATING

BACKGROUND OF INVENTION

To prolong the wear characteristics of the internal surfaces of the trochoid housing of a rotary combustion engine and of the apex seals, the internal housing walls of such engines are typically constructed of aluminum and coated with tungsten carbide. After brief periods of use, blisters have occurred on the tungsten carbide coating. The presence of the blisters on the housing wall surface causes rapid wear of the apex seals between the rotary piston and the wall surfaces. Inasmuch as the blisters increase in size after the rotary engine is disassembled and the housing is not in use, it is believed that the blisters are due to corrosion of the aluminum housing surface at the aluminum-tungsten carbide interface which is under the tungsten carbide coating. It is believed that the corrosion is caused by corrosive combustion products present in the combustion chamber which pass through the pores in the tungsten carbide coating.

SUMMARY OF INVENTION

The invention reduces blistering on the trochoid housing walls by impregnating a tungsten carbide coating on such housing walls with sealants which seal the pores of the tungsten carbide and prevent the combustion products or gases from reaching the tungsten carbide aluminum interface, thereby minimizing corrosion and prolonging the life of the housing walls. The sealants are also capable of withstanding the surface temperatures experienced by the trochoid housing walls during engine operation.

An example of a sealant which has been successfully used is sodium silicate which was pressure impregnated in the tungsten carbide coating. A second example is a polyester with a triallyl cyanurate monomer. The sealant is preferably impregnated in the housing walls by a vacuum-pressure technique. In this regard, the trochoid housing is placed in a pressure chamber which is evacuated by a vacuum pump. The fluid sealant is then introduced slowly into the pressure chamber over a predetermined period. Once the trochoid housing is covered with sealant the pressure chamber is then pressurized to a predetermined pressure which is maintained for a predetermined period to impregnate the sealant in the pores of the tungsten carbide. Upon removal of the housing from the pressure chamber, the housing is cleaned with a solvent to remove sealant from the spark plug threads or O-ring grooves. The housing is then baked at various temperature depending on the sealant used.

Further objects and advantages of the invention will become apparent from the following disclosure.

DRAWINGS

Fig. 1 is a sectional view of a trochoid housing.

Fig. 2. is a greatly enlarged cross-sectional view taken along line 2—2 Figure 1.

Figure 3 is a schematic view of some of the apparatus employed to practice the method of the invention.

Figure 4 is a diagrammatic view of a cleaning tank.

Figure 5 is a diagrammatic view of a baking oven.

Figure 6 is a sectional view similar to Figure 2 showing the trochoid housing after impregnation with a sealant in accordance with the invention.

DETAILED DESCRIPTION

Figure 1 discloses a rotary combustion engine which is generally designated 10 and which includes a housing 12 with a housing wall 14 typically constructed of an aluminum alloy in the the form of a trochoid chamber. As shown in Figure 2, the surface 15 of the wall 14 is covered by a coating 16 of tungsten carbide to afford wear resistance and to maintain an effective seal with the rotary piston end seals 17. The tungsten carbide coating desirably has a thickness of at least 0.005 inches.

To minimize corrosion of the aluminum surface 15 at the interface 18 of the aluminum surface 15 and tungsten carbide coating 16 and thus increase the life of the tungsten carbide and the end seals 17, the invention provides a method of minimizing exposure of the aluminum surface 15 to the corrosive gases and chemicals produced by combustion. The method comprises impregnating the tungsten carbide coating 16 with a sealant by the application of pressure to seal the pores of the tungsten carbide and prevent transfer of any gases or other chemicals through the tungsten carbide coating 16. Within the purview of the invention is the use of any heat resistant sealant which will withstand the temperatures associated with combustion and which will penetrate the pores to prevent corrosion of the underlying aluminum alloy.

One example of a sealant which was successfully used is industrial casting sealant No. 303, a sodium silicate solution sold by Imprex,Inc. of Milwaukee, Wis. The sodium silicate solution was impregnated in the tungsten coating 16 using apparatus as shown in FIG. 3. The apparatus includes a pressure chamber 20 provided with a detachable cover 22 which is secured to the chamber 20 by clamps 24. The pressure chamber 20 has a valve 28 for control of the pressure in the chamber 20. The apparatus also includes a vacuum pump 30 connected to a fluid trap 32. The fluid trap 32 is connected to the pressure chamber 20 by a conduit 34 provided with a valve 36. A branch conduit 38 provided with a valve 40 is connected to conduit 34. The conduit 38 is connectable to a pressure pump (not shown).

The fluid sealant is contained in a reservoir 42 which is proved with a removable cover 43 having an air valve 44. The sealant 45 is introduced into the pressure chamber 20 through an inlet passage 46 provided with a valve 47 which has one end communicating with the reservoir 42 and the other end communicating with pressure chamber 20.

In practicing the method of the invention using the foregoing apparatus the housing 12 is placed in the pressure chamber 20, valve 36 is opened and valves 28 and 47 are closed. The pressure is reduced in the pressure chamber by actuating the vacuum pump 30 and drawing a vacuum of approximately 27 inches of mercury and maintaining this pressure for a a period of 20 minutes. The valves 44 and 47 are then opened and the sodium silicate solution 45 contained in the reservoir 42 flows into the chamber 20 because of the pressure differential between chamber 20 and reservoir 42. When the housing 12 is covered with the sodium silicate fluid 45, the vacuum pressure in the chamber 20 is maintained for a first predetermined period, for example 20 minutes. Next the valves 36 and 47 an are closed and valve 40 is opened and a second pressure level of 90 to 100 pounds per square inches created in the pressure chamber 20 by a pressure pump connected to conduit 38. This increased pressure is maintained for a second predetermined period of approximately 20 minutes to impregnate the sealant 45 in the pores of the tungsten carbide coating 16 as shown in FIG. 6. The valve 47 is then opened and the excess sealant allowed to flow back to the reservoir 42. The housing is then removed from the pressure chamber 20 and rinsed in water in the tank 50 in Figure 4 for a period sufficient to remove the sodium silicate solution from the surface of the housing, the spark plug threads, and any other orifices. The next step is to bake the housing in an oven 52 (Fig. 5) for 1 at each of the following temperatures: 180°, 230°, 275°, 350° and 450° F.

A further example of a successful sealant for the tungsten carbide coating 16 is Vibrin 135 (Marco Chemical Co., Linden, New Jersey) which is a mixture of polyester thermosetting resins. The Vibrin 135 is mixed with triallyl cyanurate at a ratio of 20:1 by weight. This sealant was then impregnated in the housing 12 using the foregoing steps. Following the impregnation, the impregnated housing is then rinsed and agitated in a methylene chloride solution to remove the resin from the surface of the housing preliminary to the baking step.

The polyester triallyl cyanurate sealant is then baked on the housing 12 at a temperature of 150° F. for 1 at 230° F. for 3 hours and at an increasing temperature from 230° to 400° F. over a 1 hour period and maintained for 3 hours at 400° F.

Although only the application of two sealants is described in detail, the use of other sealants which will seal the pores of a tungsten carbide coating in a trochoid housing and withstand engine operating temperatures are within the purview of the invention. Increasing the life of any wear-resistant coating on a surface subject to corrosion is within the scope of the invention.

Various of the features of the invention are set fourth in the following claims.

We claim:

1. An internal combustion engine having a housing with internal walls coated with tungsten carbide and a sodium silicate sealant impregnated in the pores of said tungsten carbide and capable of withstanding engine operating temperatures for prolonged periods and preventing penetration to the engine housing of the combustion gas whereby to prevent corrosion at the interface between the tungsten carbide and the housing.

2. An internal combustion engine having a housing with internal walls coated with tungsten carbide and a polyester resin sealant impregnated in the pores of said tungsten carbide and capable of withstanding engine operating temperatures for prolonged periods and preventing penetration to the engine housing of the combustion gas whereby to prevent corrosion at the interface between the tungsten carbide and the housing.

PO-1050
(5/69)

UNITED STATES PATENT OFFICE
CERTIFICATE OF CORRECTION

Patent No. 3,608,535          Dated September 28, 1971

Inventor(s) John H. Winston and Burzoe K. Ghandhi

It is certified that error appears in the above-identified patent and that said Letters Patent are hereby corrected as shown below:

Column 2, line 31    "proved" should be --- provided ---;

Column 2, line 48    delete "an";

Column 2, line 50    "inches" should be --- inch is ---;

Column 2, line 61    after "1" insert --- hour ---;

Column 2, line 73    after "1" insert --- hour ---.

Signed and sealed this 4th day of April 1972.

(SEAL)
Attest:

EDWARD M. FLETCHER, JR.
Attesting Officer

ROBERT GOTTSCHALK
Commissioner of Patents